US011126367B2

(12) United States Patent
Benisty

(10) Patent No.: US 11,126,367 B2
(45) Date of Patent: Sep. 21, 2021

(54) STORAGE SYSTEM AND METHOD FOR DETERMINING ECOSYSTEM BOTTLENECKS AND SUGGESTING IMPROVEMENTS

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 212 days.

(21) Appl. No.: 15/921,375

(22) Filed: Mar. 14, 2018

(65) Prior Publication Data

US 2019/0286363 A1     Sep. 19, 2019

(51) Int. Cl.
*G06F 3/06*     (2006.01)

(52) U.S. Cl.
CPC .......... *G06F 3/0653* (2013.01); *G06F 3/0604* (2013.01); *G06F 3/0683* (2013.01)

(58) Field of Classification Search
CPC .... G06F 3/0653; G06F 3/0604; G06F 3/0671; G06F 3/0683; G06F 3/061; G06F 3/06
See application file for complete search history.

(56) References Cited

U.S. PATENT DOCUMENTS

| 5,640,600 | A  | * | 6/1997 | Satoh .................. G06F 11/349 710/107 |
| 6,618,777 | B1 | * | 9/2003 | Greenfield .......... G06F 13/1605 710/120 |
| 9,454,321 | B1 | * | 9/2016 | Smaldone ............. G06F 3/0653 |
| 10,049,076 | B2 | * | 8/2018 | Vucinic ............... G06F 11/3027 |
| 10,740,270 | B2 | * | 8/2020 | Depew ................ G06F 11/3027 |
| 2002/0099875 | A1 | * | 7/2002 | Locklear ............... G06F 11/349 710/2 |
| 2008/0091905 | A1 | * | 4/2008 | Brittain ............... G06F 13/1626 711/167 |
| 2008/0133489 | A1 | * | 6/2008 | Armstead ............. G06F 11/349 |
| 2009/0043886 | A1 | * | 2/2009 | Ebersole ............. H04L 12/4625 709/224 |
| 2009/0254525 | A1 | * | 10/2009 | Srinivasan ............ G06F 16/252 |
| 2010/0304794 | A1 | * | 12/2010 | Beninghaus ........ H04W 52/028 455/574 |
| 2014/0089735 | A1 | * | 3/2014 | Barrett .................... H04L 69/28 714/27 |

(Continued)

Primary Examiner — Pierre Miche Bataille
(74) Attorney, Agent, or Firm — Dickinson Wright PLLC; Steven Hurles

(57) ABSTRACT

A storage system and method for determining ecosystem bottlenecks and suggesting improvements are provided. In one embodiment, a storage system is provided comprising a memory and a controller. The controller comprises a plurality of hardware components, at least one of the hardware components configured to communicate with the memory; a plurality of busses connecting the hardware components; a plurality of monitors, wherein each monitor is configured to collect information on utilization of a respective one of the plurality of busses; and a processor in communication with the plurality of monitors, wherein the processor is configured to: analyze the information on utilization of the busses collected from the plurality of monitors; and provide a result of the analysis to a device external to the storage system.

15 Claims, 7 Drawing Sheets

(56) References Cited

U.S. PATENT DOCUMENTS

2016/0164698 A1* 6/2016 Hofmann ................ H04L 43/16
　　　　　　　　　　　　　　　　　　　　　　370/253
2018/0165238 A1* 6/2018 Depew .................. G06F 13/122
2021/0208781 A1* 7/2021 Chen ..................... G06F 3/0619

* cited by examiner

STORAGE SYSTEM AND METHOD FOR DETERMINING ECOSYSTEM BOTTLENECKS AND SUGGESTING IMPROVEMENTS

BACKGROUND

Bottlenecks can exist in an ecosystem, such as a storage system. For example, a storage system can have a plurality of hardware components, and a bottleneck occurring in or between these components can have a detrimental effect on the performance of the storage system. If an ecosystem is fairly complex, it can be very difficult to detect and identify the bottlenecks.

DETAILED DESCRIPTION

Overview

Figure 1A:
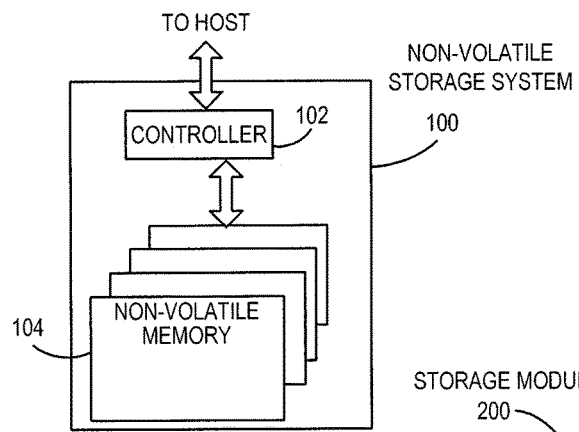
FIG. 1A is a block diagram of a non-volatile storage system of an embodiment.

By way of introduction, the below embodiments relate to a storage system and method for determining ecosystem bottlenecks and suggesting improvements.

In one embodiment, a storage system is provided comprising a memory and a controller. The controller comprises a plurality of hardware components, at least one of the hardware components configured to communicate with the memory; a plurality of busses connecting the hardware components; a plurality of monitors, wherein each monitor is configured to collect information on utilization of a respective one of the plurality of busses; and a processor in communication with the plurality of monitors, wherein the processor is configured to: analyze the information on utilization of the busses collected from the plurality of monitors; and provide a result of the analysis to a device external to the storage system.

In some embodiments, the information on utilization comprises at least one of the following: performance, latency, and power consumption.

In some embodiments, the information on utilization comprises at least one of the following: idle time of the bus, average performance of the bus, peak performance of the bus, estimated peak power consumed by the bus, estimated average power consumed by the bus, total byte count transferred by the bus, latency of the bus, number of outstanding requests sent on the bus, an attribute of a transaction sent on the bus, efficiency of a transaction sent on the bus, and an error transaction on the bus.

In some embodiments, the controller is configured to analyze the information in response to at least one of the following: a general-purpose input-output (GPIO) signal, a request from a host to write a predetermined value in a register in the storage system, a predetermined command received from the host, and a firmware request generated by the processor.

In some embodiments, the result of the analysis is provided to a host in response to a request from the host.

In some embodiments, the request from the host comprises a Get Log Page command.

In some embodiments, the result of the analysis is provided to an intermediate controller between the storage system and a host.

In some embodiments, the result of the analysis comprises at least one of the following: an identification of a bottleneck in the controller and a suggestion for overcoming the bottleneck.

In some embodiments, the suggestion comprises at least one of the following: a suggestion that a host increase a command queue depth, a suggestion that the host increase a completion queue depth, a suggestion that the host decrease turn-around time, and a suggestion that the host change a command sequence.

In some embodiments, the plurality of hardware components comprises at least one of the following: a MAC PHY module, a command fetcher, a command executer, a direct memory access (DMA) module, a flash interface module, an error correction module, a control path module, and a scheduler.

In some embodiments, all of the plurality of monitors are identical to each another.

In some embodiments, at least one of the monitors comprises one or more of the following: a bus parser, a power estimator, an efficiency evaluator, a performance calculator, an idle time counter, a transfer size counter, an error transaction counter, an unaligned transaction counter, an aligned transaction counter, an average outstanding commands module, a latency measurement module, a priority transaction counter, a special transaction counter, and a cache operation counter.

In some embodiments, the memory comprises a three-dimensional memory.

In another embodiment, a method for determining a bottleneck in a controller of a storage system is provided. The method comprises using a plurality of bus monitors in a controller of a storage system to: collect information from buses connecting a plurality of hardware components in the controller; and transfer the information from the plurality of bus monitors to a processor in the controller; and using the processor in the controller to: analyze the information transferred from the plurality of monitor to identify a bottleneck in the controller; and send, to a host, a suggestion to reduce the bottleneck.

In some embodiments, the suggestion is sent to the host in response to receiving a Get Log Page command from the host.

In some embodiments, all of the plurality of bus monitors are identical to each another.

In some embodiments, the suggestion comprises at least one of the following: a suggestion that the host increase a command queue depth, a suggestion that the host increase a completion queue depth, a suggestion that the host decrease turn-around time, and a suggestion that the host change a command sequence.

In another embodiment, a storage system is provided comprising: a plurality of hardware components; a plurality of busses connecting the hardware components; means for collecting information on utilization of the plurality of busses; means for analyzing the information on utilization of the plurality of busses; and means for providing a result of the analysis to a host.

In some embodiments, the storage system is removably connectable to the host.

In some embodiments, the storage system is embedded in the host.

Other embodiments are possible, and each of the embodiments can be used alone or together in combination. Accordingly, various embodiments will now be described with reference to the attached drawings.

Embodiments

Figure 1B:
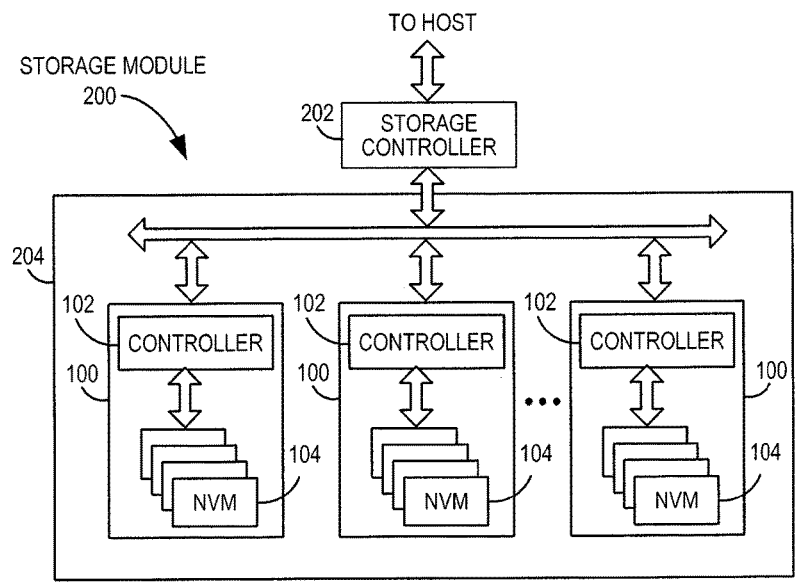
FIG. 1B is a block diagram illustrating a storage module of an embodiment.
Figure 1C:
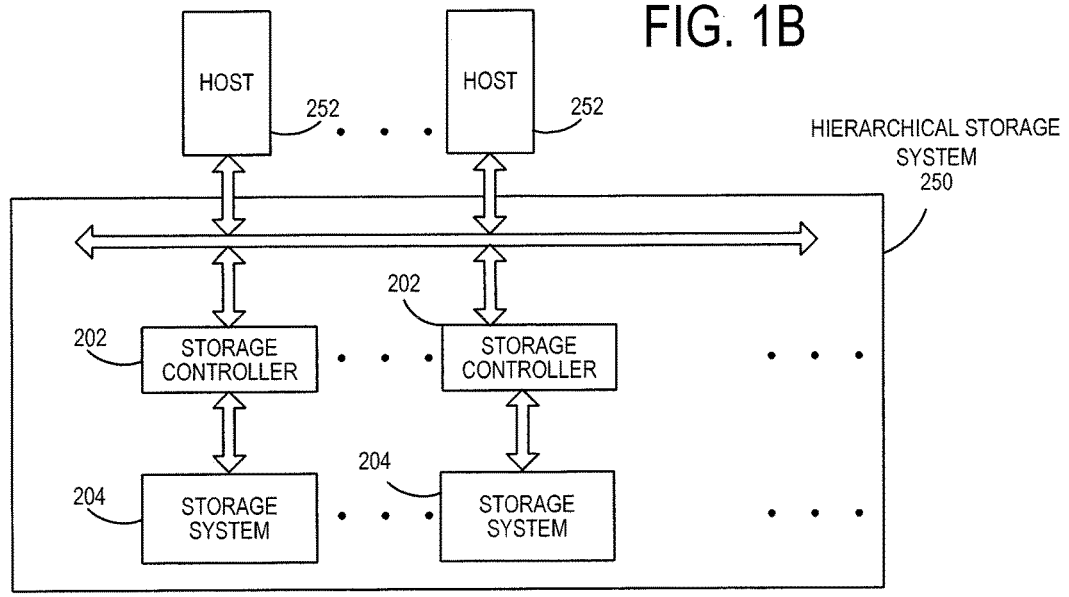
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, Re-RAM, PCM, or MRAM controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interface express (PCIe) interface, or dual-date-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
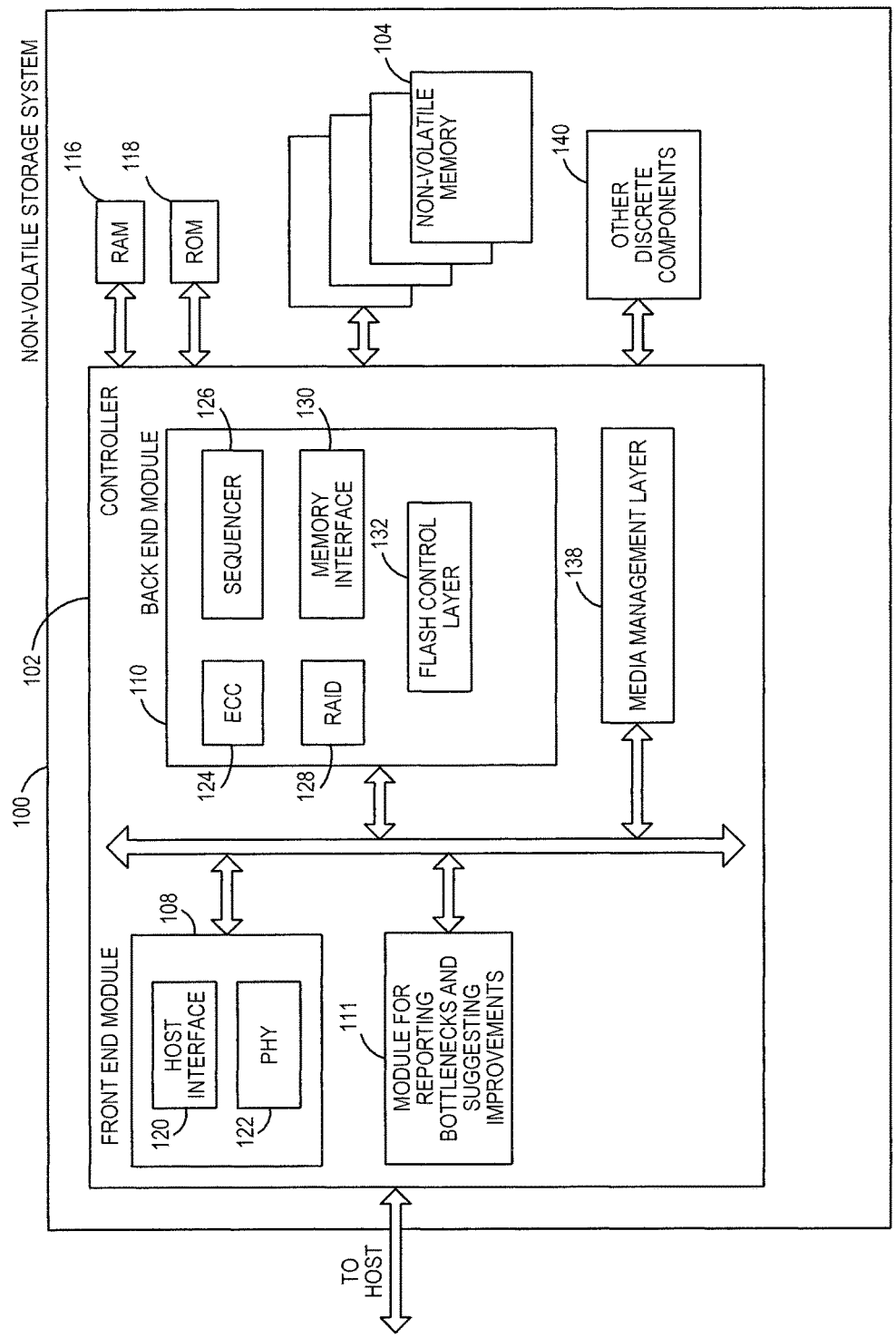
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a module for reporting bottlenecks and suggesting improvements 111, which will be discussed in more detail below and can be implemented in hardware or software/firmware to perform the algorithms and methods discussed herein and shown in the attached drawings.

Referring again to modules of the controller 102, a buffer manager/bus controller (not shown) manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
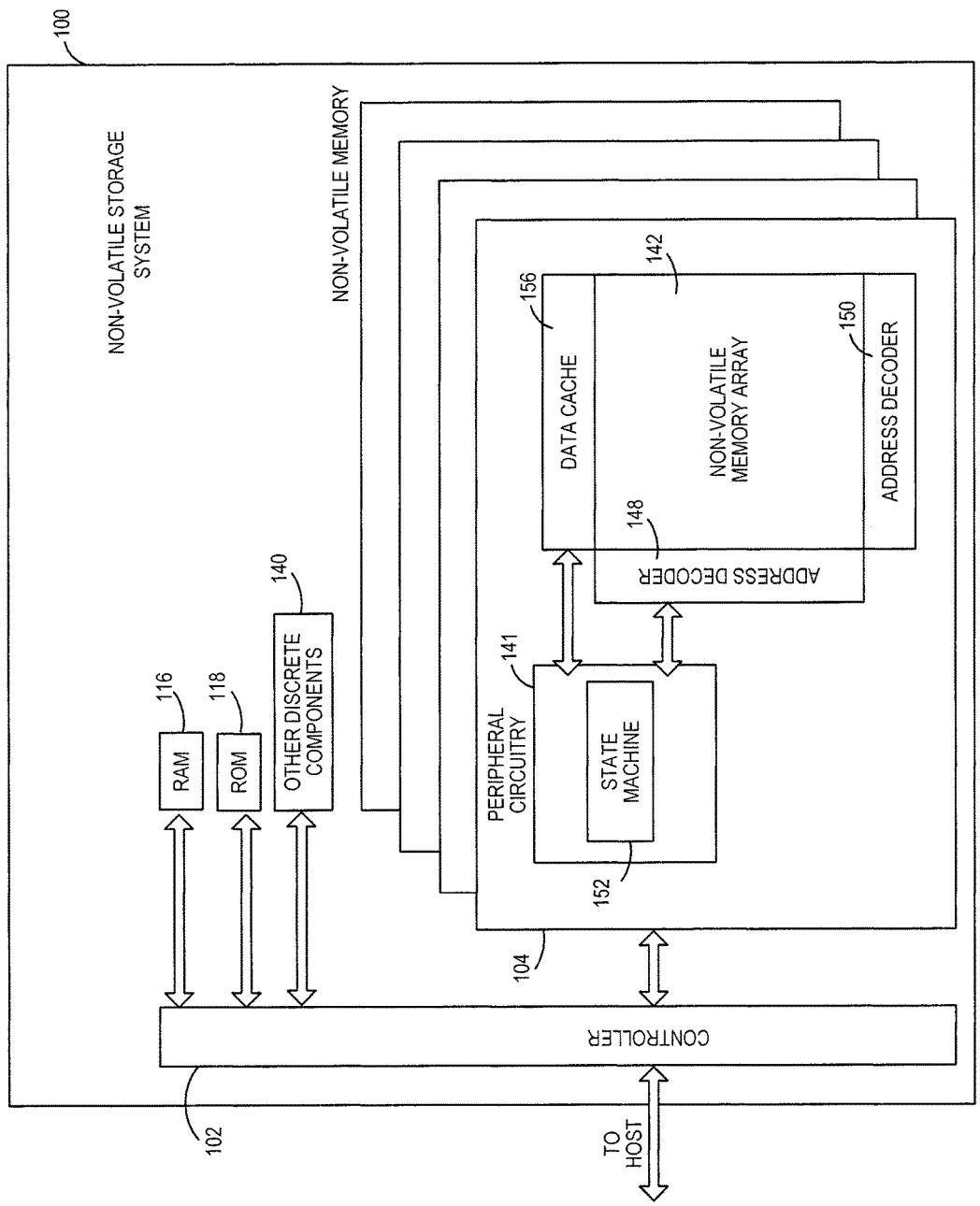
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Figure 3:
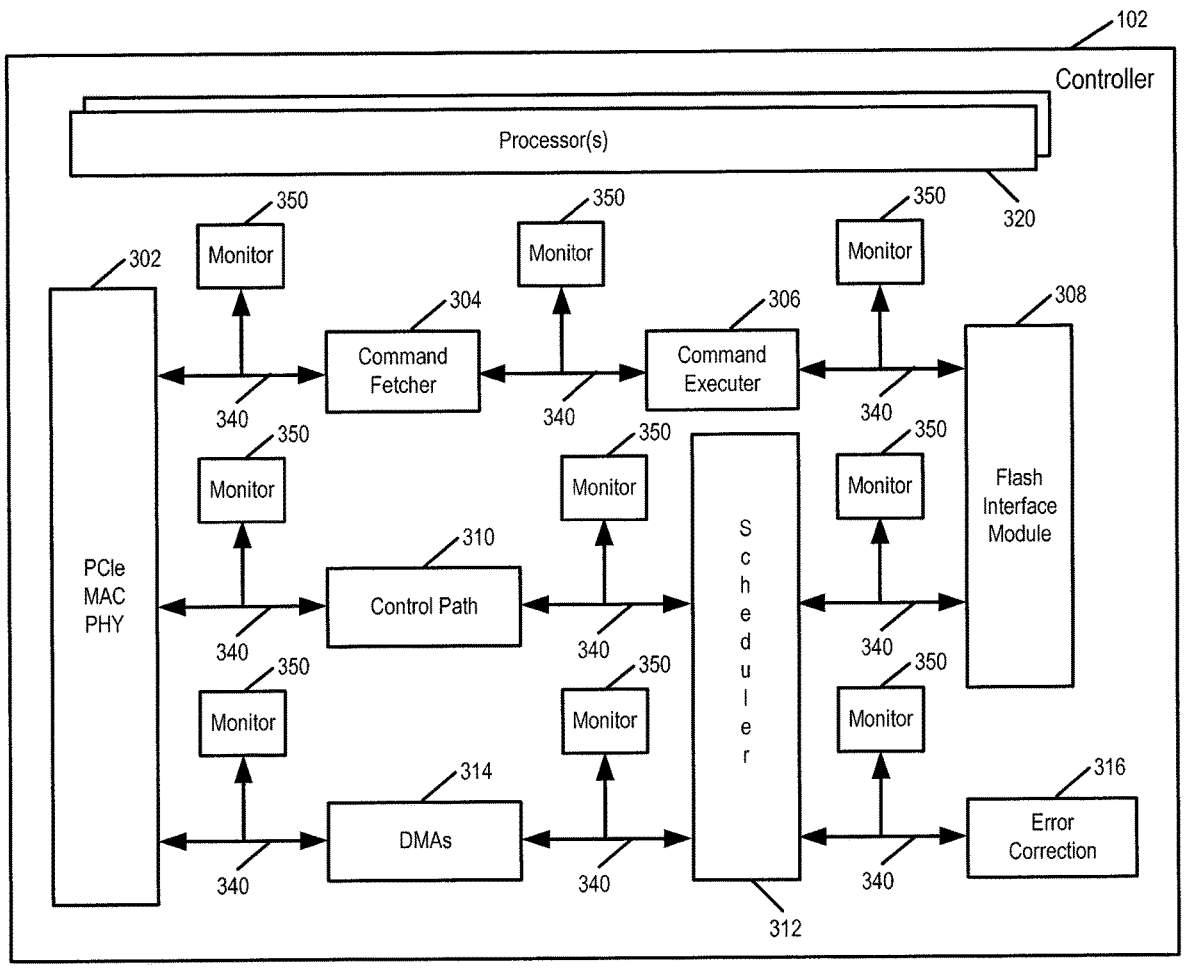
FIG. 3 is a block diagram of a storage system controller of an embodiment.

FIG. 3 is an illustration of one particular implementation of the controller 102 of an embodiment. It should be noted that this is just an example, and other implementations can be used. As shown in FIG. 3, in this embodiment, the controller 102 comprises a plurality of hardware components; here, a PCIe MAC PHY module 302, a command fetcher 304, a command executer 306, a flash interface module 308, a control path module 310, a scheduler 312, a direct memory access (DMA) module 314, an error correction module 316, and one or more processor(s) 320.

"PHY" is an abbreviation for the physical layer and refers to the circuitry used to implement physical layer functions. The PHY can connect a link layer device called a MAC (media access control) to a physical medium, such as a wire, cable, or fiber. There are many protocols defined in the industry for this interface, such as, but not limited to, Peripheral Component Interconnect Express (PCIe), SATA, and NVMe. The MAC and PHY can implement three low protocol layers (Transaction layer, Data Link layer, and Physical layer). While the MAC PHY 302 is the interface between the controller 102 and the host, the flash interface module 308 is the interface between the controller 102 and the memory arrays 104. The flash interface module (FIM) 308 is responsible for low-level interaction with the memory arrays 104. While flash is used in this example, it should be noted that other memory technologies can be used.

In general, the command fetcher 304 is responsible for fetching and parsing commands from a host and queuing them internally, the command executer 306 is responsible for arbitrating and executing the commands, the control path module 310 and scheduler 312 are responsible for scheduling and activating other blocks while posting control messages, the DMA module 314 is responsible for the actual data transfer between the host and the storage system 100, the flash interface module 308 is responsible for communicating with the memory 104 (e.g., controlling and accessing the memory arrays), the error correction module 316 is responsible for error correction, and the processor(s) 320 are responsible for execution of front-end and back-end tasks. As also shown in FIG. 3, there are a plurality of busses 340 connecting the various hardware components.

As mentioned in the background section above, bottlenecks can exist in a storage system, and such bottlenecks can be very difficult to detect and identify. While some bottlenecks can be detected by specific components that are integrated in the ecosystem, those components may not have the full picture of the ecosystem and not have enough information to identify various issues and non-optimal behaviors. The following embodiments can be used to address the challenge of identifying ecosystem bottlenecks on the fly and for generating ways for improving performance of the storage system's controller 102.

Returning to FIG. 3, in this embodiment, the controller 102 comprises a plurality of monitors 350, wherein each monitor 350 is configured to collect information on utilization of a respective one of the plurality of busses 340. The collected information can be sent from each of the monitors

350 to the processor(s) 320. (Although not shown in FIG. 3, the monitors 350 are in communication with the processor(s) 320.) The module for reporting bottlenecks and suggesting improvements 111 that we mentioned above can include the monitors 350 and processor(s). Also, while the term "processor(s)" is being used herein, it should be understood that a single processor or multiple processors can be used.

The information on utilization of a bus can relate to, inter alia, performance, latency, and/or power consumption. For example, the information on utilization can comprise at least one of the following: idle time of the bus, average performance of the bus, peak performance of the bus, estimated peak power consumed by the bus, estimated average power consumed by the bus, total byte count transferred by the bus, latency of the bus, number of outstanding requests sent on the bus, an attribute of a transaction sent on the bus, efficiency of a transaction sent on the bus, and an error transaction on the bus. These are just examples and other information on utilization can be used.

Figure 4:
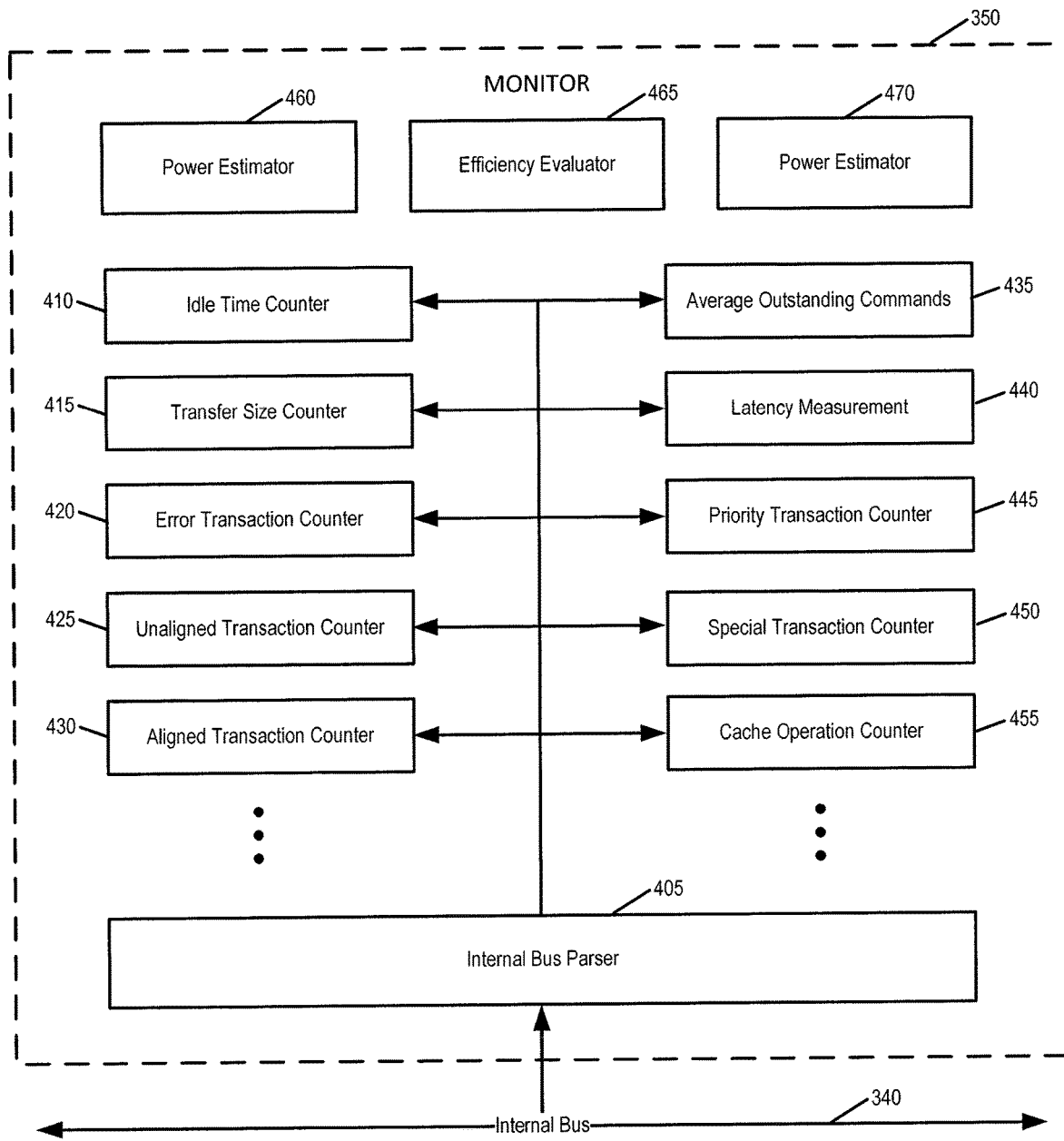
FIG. 4 is a block diagram of a monitor of an embodiment.

The monitor 350 can take any suitable form, and FIG. 4 is a block diagram of a monitor 350 of an embodiment. As shown in FIG. 4, the monitor 350 of this embodiment comprises a bus parser 405, an idle time counter 410, a transfer size counter 415, an error transaction counter 420, an unaligned transaction counter 425, an aligned transaction counter 430, an average outstanding commands module 435, a latency measurement module 440, a priority transaction counter 445, a special transaction counter 450, a cache operation counter 455, a power estimator 460, an efficiency evaluator 465, and a performance calculator 470. Some or all of these various components can be implemented in hardware or software/firmware (e.g., using a processor in the monitor to execute computer-readable program code). In one embodiment, all of the monitors 350 are identical to each other, with a given monitor using whatever components in the monitor 350 that are relevant for its respective bus. In another embodiment, at least one of the monitors is different from the others.

In general, the internal bus parser 405 parses transactions that are transferred on the monitored bus and updates the other sub-components in the monitor 350. In each "dead cycle" on this bus which the bus is idle, a notification is posted to the idle time counter 410 in order to increment the value of this counter 410. Whenever data is transferred on the bus, the number of valid transferred bytes is captured in the transfer size counter 415. When the parser detects a transaction terminated with error, a notification is posted to the error transaction counter 420. Whenever transferring unaligned transactions on the bus, a notification is posted to the unaligned transaction counter 425 in order to increment its value. Whenever transferring aligned transactions on the bus, a notification is posted to the aligned transaction counter 430 in order to increment its value. The internal bus parser 405 updates the average outstanding commands block 435 about the current value of the outstanding commands and this block collects the statistic of the parameter (e.g., average, mean, max, min, etc.). The latency measurement block 440 gets a notification when a transaction is initiated and when it is completed. Using this information, the latency is calculated and collected. Whenever a transaction with high priority is transferred, a notification is posted to the priority transaction counter 445. Whenever a special transaction is transferred, a notification is posted to the special transaction counter 450. Several counters may be implemented in this block. Whenever a cached transaction is transferred, a notification is posted to the cache transaction counter 455. On top of that, the power estimator 460, the efficiency evaluator 465, and the performance calculator 470 gather information from all the components and calculate/estimate the relevant parameter.

Figure 5:
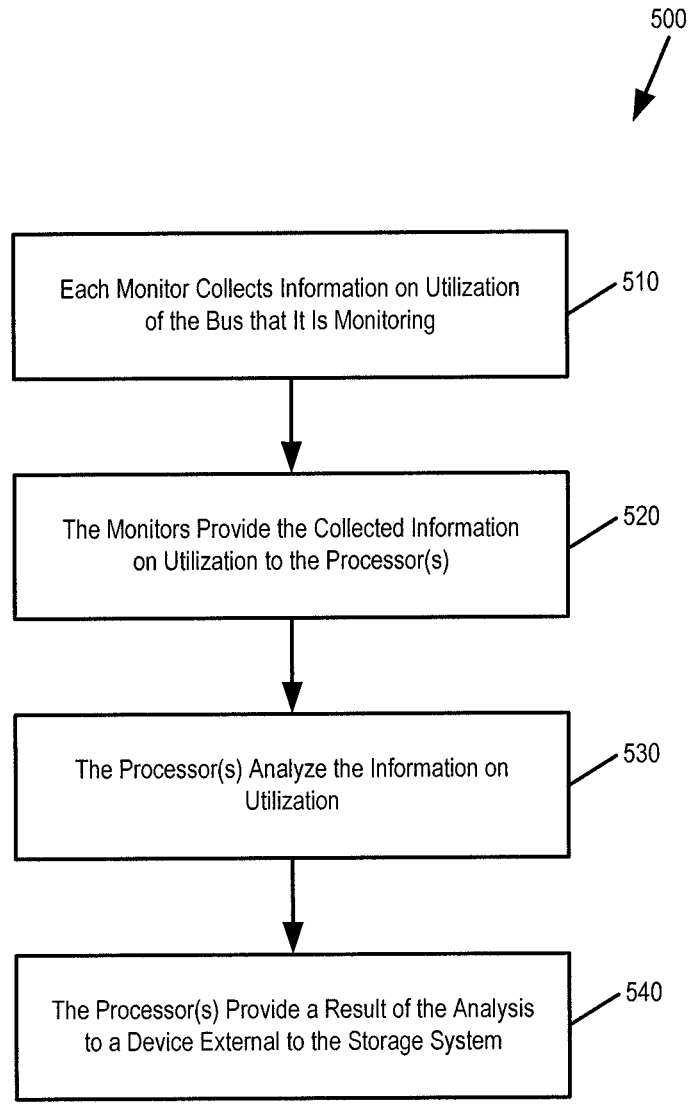
FIG. 5 is flow chart of a method of an embodiment for determining a bottleneck in a controller and suggesting an improvement.

FIG. 5 is a flow chart 500 of a method of an embodiment for using the monitors 350 to identify bottlenecks in the controller 102 and suggest improvements. As shown in FIG. 5, each monitor 350 collects information on utilization of the bus 340 that it is monitoring (act 510). The monitors 350 then provide the collected information on utilization to the processor(s) 320 (act 520). Next, the processor(s) 320 analyze the information on utilization of the busses collected from the monitors (act 530). The processor(s) 320 can perform this analysis in response to a request. The request can take any suitable form, such as, but not limited to, a general-purpose input-output (GPIO) signal, a request from the host to write a predetermined value in a register in the storage system, a predetermined command received from the host, and a firmware request generated by the processor.

Figure 6:
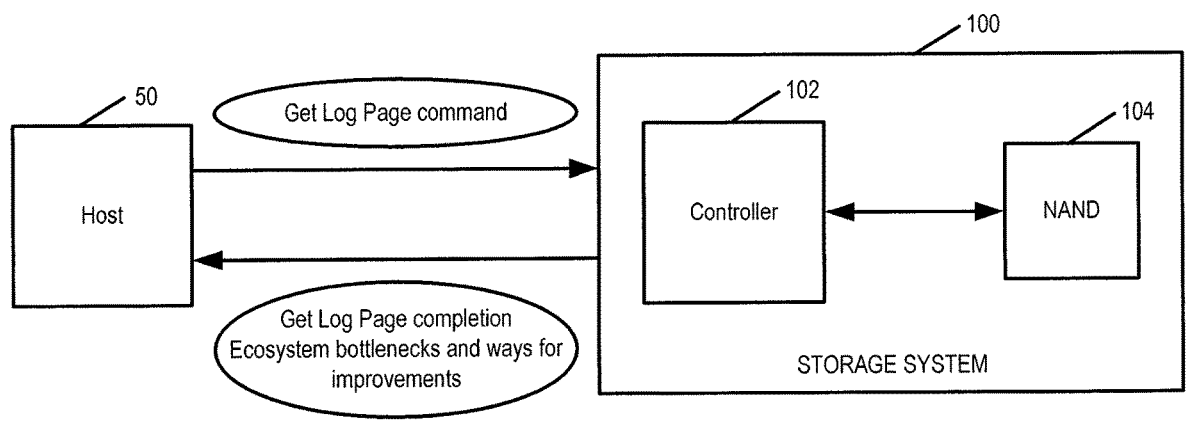
FIG. 6 is a block diagram illustrating an interaction between a storage system and a host of an embodiment.

Next, the processor(s) 320 provide a result of the analysis to a device external to the storage system 100 (act 540). For example, the processor(s) 320 can provide the result of the analysis to a host 50 in response to a request from the host (e.g., Get Log Page command with an "analyze" attribute). This is illustrated in the block diagram 600 in FIG. 6. As another example, the processor(s) 320 can provide the result of the analysis to an intermediate controller between the storage system 100 and the host 50.

The result of the analysis can take any suitable form, such as an identification of a bottleneck in the controller 102 and/or a suggestion for overcoming the bottleneck. For example, the processor(s) 320 can be is configured to identify the bottleneck by comparing the collected information on utilization to reference data. Examples of suggestions for overcoming the bottleneck include, but are not limited to, a suggestion that the host increase a command queue depth, a suggestion that the host increase a completion queue depth, a suggestion that the host decrease turn-around time, and a suggestion that the host change a command sequence. In general, these suggestions can be implemented by the host in order to get better usage of the storage system 100; however, the host may or may not follow the suggestions. Also, in embodiments where the suggestions are provided to an intermediate controller instead of the host, the intermediate controller can make the decision on whether or not to follow the suggestions to change its behavior.

There are many advantages associated with these embodiments. For example, by being able to collect performance, latency, and power consumption information on the fly, the storage system 100 can analyze the information to identify bottlenecks in the storage system's ecosystem and/or propose ways for overcoming those bottlenecks by changing several behaviors. A host or other external device may use these suggestions for further adaptation and improvements in its use of the storage system 100.

Additionally, by using a generic on-die performance and latency hardware monitor to collect bus utilization information, an instantiation of this generic monitor can be attached to any internal bus implemented in the controller 102. Each instantiation of this generic module can collect the utilization information for its monitored bus and provide it to the processor(s) 320. The processor(s) 320 can analyze the information collected from the various monitors 350, identify the system bottlenecks, and suggests way for further improvements. Such suggestions can be used by the host to change its behavior in a way that would lead to better usage of the storage system 100 in ten is of performance and power consumption.

In summary, these embodiments can be used to create an adaptive ecosystem that improves itself (e.g., in terms of performance, latency, and/or power consumption) based on the current situation. These embodiments also provide simplicity when a single, generic hardware monitor is used that can be attached to any internal bus. Further, using these embodiments can provide a debugging advantage in that they may simplify debugging performance issues.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller comprising:
a plurality of hardware components, at least one of the hardware components configured to communicate with the memory;
a plurality of busses connecting the hardware components, wherein the plurality of busses are located within the controller;
a plurality of monitors, wherein each monitor is configured to collect information on bus utilization of a respective one of the plurality of busses located within the controller; and
a processor in communication with the plurality of monitors, wherein the processor is configured to:
analyze the information on bus utilization of the plurality of busses located within the controller, wherein the information on bus utilization indicates idle time versus busy time for each of the plurality of busses;
identify bottlenecks in the controller based on the analysis; and
provide suggestions to a device external to the storage system, the suggestions comprising at least one of: increasing a command queue depth, increasing a completion queue depth, decreasing a turn-around time, and changing a command sequence.

2. The storage system of claim 1, wherein the controller is configured to analyze the information in response to at least one of the following: a general-purpose input-output (GPIO) signal, a request from a host to write a predetermined value in a register in the storage system, a predetermined command received from the host, and a firmware request generated by the processor.

3. The storage system of claim 1, wherein the result of the analysis is provided to a host in response to a request from the host.

4. The storage system of claim 3, wherein the request from the host comprises a Get Log Page command.

5. The storage system of claim 1, wherein the result of the analysis is provided to an intermediate controller between the storage system and a host.

6. The storage system of claim 1, wherein the plurality of hardware components comprises at least one of the following: a medium access control physical (MAC PHY) module, a command fetcher, a command executer, a direct memory access (DMA) module, a flash interface module, an error correction module, a control path module, and a scheduler.

7. The storage system of claim 1, wherein all of the plurality of monitors are identical to each other.

8. The storage system of claim 1, wherein at least one of the monitors comprises one or more of the following: a bus parser, a power estimator, an efficiency evaluator, a performance calculator, an idle time counter, a transfer size counter, an error transaction counter, an unaligned transaction counter, an aligned transaction counter, an average outstanding commands module, a latency measurement module, a priority transaction counter, a special transaction counter, and a cache operation counter.

9. The storage system of claim 1, wherein the memory comprises a three-dimensional memory.

10. The storage system of claim 1, wherein the information of bus utilization of the plurality of busses located in the controller comprises at least one of: peak performance of the busses, estimated peak power consumption by the busses, estimated average power consumed by the busses, total byte count transferred by the busses, latency of the busses, number of outstanding requests sent on the busses, an attribute of a transaction sent on the busses, and an error transaction on the busses.

11. The storage system of claim 10, wherein at least one monitor of the plurality of monitors is configured to collect the bus utilization information on the fly.

12. The storage system of claim 1, wherein the controller enables creating an adaptive ecosystem that improves itself, wherein the suggestions provided to the connected system to overcome the bottlenecks are provided on the fly.

13. A storage system comprising:
a controller comprising:
a plurality of hardware components; and
a plurality of busses connecting the hardware components, wherein the plurality of busses are located within the controller;
means for collecting information on bus utilization of the plurality of busses located within the controller,
means for analyzing the information on bus utilization of the plurality of busses located within the controller, wherein the information on bus utilization indicates idle time versus busy time for each of the plurality of busses;
means for identifying bottlenecks in a controller based on the analysis; and
means for providing suggestions to a host, wherein the suggestions comprise at least one of:
increasing a command queue depth, increasing a completion queue depth, decreasing a turn-around time, and changing a command sequence.

14. The storage system of claim 13, wherein the storage system is removable connectable to the host.

15. The storage system of claim 13, wherein the storage system is embedded in the host.

* * * * *